US009997285B2

(12) United States Patent
Matthiesen

(10) Patent No.: US 9,997,285 B2
(45) Date of Patent: Jun. 12, 2018

(54) TRANSFORMATION ENABLED NITRIDE MAGNETS ABSENT RARE EARTHS AND A PROCESS OF MAKING THE SAME

(71) Applicant: Case Western Reserve University, Cleveland, OH (US)

(72) Inventor: David Matthiesen, Cleveland, OH (US)

(73) Assignee: Case Western Reserve University, Cleveland, OH (US)

(*) Notice: Subject to any disclaimer, the term of this patent is extended or adjusted under 35 U.S.C. 154(b) by 766 days.

(21) Appl. No.: 14/304,102

(22) Filed: Jun. 13, 2014

(65) Prior Publication Data

US 2014/0290434 A1 Oct. 2, 2014

Related U.S. Application Data

(63) Continuation of application No. PCT/US2012/070086, filed on Dec. 17, 2012.

(Continued)

(51) Int. Cl.
*B22F 1/02* (2006.01)
*H01F 1/24* (2006.01)
(Continued)

(52) U.S. Cl.
CPC .............. *H01F 1/24* (2013.01); *B22F 1/02* (2013.01); *C01B 21/0622* (2013.01);
(Continued)

(58) Field of Classification Search
None
See application file for complete search history.

(56) References Cited

U.S. PATENT DOCUMENTS 5,164,104 A 11/1992 Kobayashi et al.
5,425,818 A 6/1995 Hirosawa et al.
(Continued)

FOREIGN PATENT DOCUMENTS

JP 56100112 A 11/1981
JP 60221325 A 11/1985
(Continued)

OTHER PUBLICATIONS

M. Q. Huang et al., "Syntesis and Characterization of Fe16N2 in Bulk Form", J. Appl. Phys., May 15, 1994, vol. 75, No. 10, pp. 6574-6576.
(Continued)

*Primary Examiner* — Jessee R Roe
*Assistant Examiner* — Ngoclan T Mai
(74) *Attorney, Agent, or Firm* — Renner, Otto, Boisselle & Sklar, LLP

(57) ABSTRACT

A process for producing an ordered martensitic iron nitride powder that is suitable for use as a permanent magnetic material is provided. The process includes fabricating an iron alloy powder having a desired composition and uniformity; nitriding the iron alloy powder by contacting the material with a nitrogen source in a fluidized bed reactor to produce a nitride iron powder; transforming the nitride iron powder to a disordered martensitic phase; annealing the disordered martensitic phase to an ordered martensitic phase; and separating the ordered martensitic phase from the iron nitride powder to yield an ordered martensitic iron nitride powder.

22 Claims, 2 Drawing Sheets

Related U.S. Application Data

(60) Provisional application No. 61/570,955, filed on Dec. 15, 2011.

(51) Int. Cl.

| | | |
|---|---|---|
| *C01B 21/06* | (2006.01) | |
| *C04B 35/58* | (2006.01) | |
| *C04B 35/626* | (2006.01) | |
| *H01F 1/06* | (2006.01) | |
| *H01F 1/08* | (2006.01) | |
| *C23C 8/62* | (2006.01) | |
| *H01F 41/02* | (2006.01) | |
| *B22F 9/08* | (2006.01) | |
| *C22C 33/02* | (2006.01) | |

(52) U.S. Cl.
CPC .... *C04B 35/58042* (2013.01); *C04B 35/6265* (2013.01); *C04B 35/6268* (2013.01); *C04B 35/62615* (2013.01); *C23C 8/62* (2013.01); *H01F 1/065* (2013.01); *H01F 1/083* (2013.01); *H01F 41/0266* (2013.01); *B22F 9/082* (2013.01); *C01P 2002/54* (2013.01); *C01P 2006/42* (2013.01); *C04B 2235/405* (2013.01); *C04B 2235/46* (2013.01); *C04B 2235/465* (2013.01); *C22C 33/0264* (2013.01)

(56) References Cited

U.S. PATENT DOCUMENTS

| | | |
|---|---|---|
| 5,647,886 A | 7/1997 | Kitazawa et al. |
| 6,319,485 B1 | 11/2001 | Nagatomi et al. |
| 2006/0193742 A1* | 8/2006 | Miura .................. B22F 1/0044 419/52 |
| 2007/0071630 A1* | 3/2007 | Fukuhara .................. B22F 3/24 419/13 |
| 2009/0184281 A1 | 7/2009 | Yadav et al. |
| 2010/0068512 A1 | 3/2010 | Imaoka et al. |
| 2011/0059005 A1* | 3/2011 | Sankar ................ C01B 21/0622 423/409 |
| 2012/0244356 A1 | 9/2012 | Takahashi et al. |

FOREIGN PATENT DOCUMENTS

| | | |
|---|---|---|
| JP | 07118702 A | 5/1995 |
| JP | 8165502 A | 6/1996 |
| JP | 2000082610 A | 3/2000 |
| JP | 2011051814 A | 3/2011 |
| WO | 2011049080 A1 | 4/2011 |

OTHER PUBLICATIONS

K. H. Jack, "The Syntesis, Structure, and Characterization of α"Fe16N2 (invited)", J. Appl. Phys., Nov. 15, 1994, vol. 76, No. 10, pp. 6620-6625.

Iron Nitride Permanent Magnet, Alternative to Rare Earth and Neodymium Magnets. University of Minnesota. Last Modified on Jun. 25, 2010 [retrieved Feb. 27, 2012]. Retrieved from the internet: <URL: _20120016.aspx>; first and last bullets on page.

W.E. Wallace et al; Enhanced Fe moment in nitrogen martensite and Fe16N2 (Invited); J. Appl. Phys. 76 (10), Nov. 15, 1994; pp. 6648-6652.

* cited by examiner

TRANSFORMATION ENABLED NITRIDE MAGNETS ABSENT RARE EARTHS AND A PROCESS OF MAKING THE SAME

CROSS-REFERENCE

This application is a continuation of International Application No. PCT/US2012/070086, filed Dec. 17, 2012 and designating the U.S., which claims the benefit of U.S. Provisional Application No. 61/570,955 filed on Dec. 15, 2011 which are both hereby incorporated by reference in their entirety for all purposes as if fully set forth herein.

GOVERNMENT SUPPORT

This invention was made with Government Support under grant number DE-AR0000194, awarded by the U.S. Department of Energy. The Government has certain rights in the invention.

TECHNICAL FIELD

The disclosure relates generally to a composition of iron nitride magnetic powder suitable for use in permanent magnet applications such as wind turbine generators, electric vehicle motors, and the like, and a method of producing the powder.

BACKGROUND

Rare-earth magnets are strong permanent magnets made from alloys of rare earth elements. Rare-earth magnets have significant performance advantages over ferrite or alnico magnets. There are two types of rare-earth magnets: neodymium magnets and samarium-cobalt magnets. The total world market for rare-earth permanent magnets is projected to be $17.2B by 2020, with China expected to control 74% (by tonnage) of this market. The rare-earth magnet segment of this market is expected to continue to grow and is predicted to account for approximately 30% of this total. Accordingly, the market and need for strong permanent magnets is substantial, whereas the supply is limited.

$Fe_{16}N_2$ has been identified as a potential alternative to rare earth metal magnets. FIG. 1a shows the performance (as indicated by the remanence, Br) as a function of density for $\alpha''$-Fe16N2 and other classes of permanent magnet materials. A material with high performance and low density is desired because these are critical factors in achieving the system level goals of scalability and cost. The projected cost advantage of $\alpha''$-Fe16N2 over other permanent magnet materials is shown in FIG. 1b.

The limitation of the current state of the art is that 100% transformation to single-phase $\alpha''$-$Fe_{16}N_2$—the phase that exhibits the outstanding magnetic properties—has only been accomplished by sputtering or evaporation in an environment supersaturated with nitrogen. However, when bulk powders or thin films are processed using traditional diffusion techniques, equilibrium thermodynamics limits the available nitrogen to <10.3 at % N. Thus, complete transformation of these powders has never been achieved in the reported literature, even using nano-scale starting powders.

SUMMARY

In accordance with some aspects of the disclosure, a process for producing an ordered martensitic iron nitride powder that is suitable for use as a permanent magnetic material is provided. The process includes fabricating an iron alloy powder having a desired composition and uniformity, nitriding the iron alloy powder by contacting the material with a nitrogen source in a fluidized bed reactor to produce a nitride iron powder, transforming the nitride iron powder to a disordered martensitic phase, annealing the disordered martensitic phase to an ordered martensitic phase and separating the ordered martensitic phase from the iron nitride powder to yield an ordered martensitic iron nitride powder.

In another aspect of the disclosure, a permanent magnet composition comprising an ordered martensitic iron nitride that has been transformed from an austenite phase wherein the magnet composition does not include any substantial amount of rare earth elements is provided.

In yet another aspect of the disclosure, a magnet comprising an ordered martensitic iron nitride powder is provided.

Figure 1A:
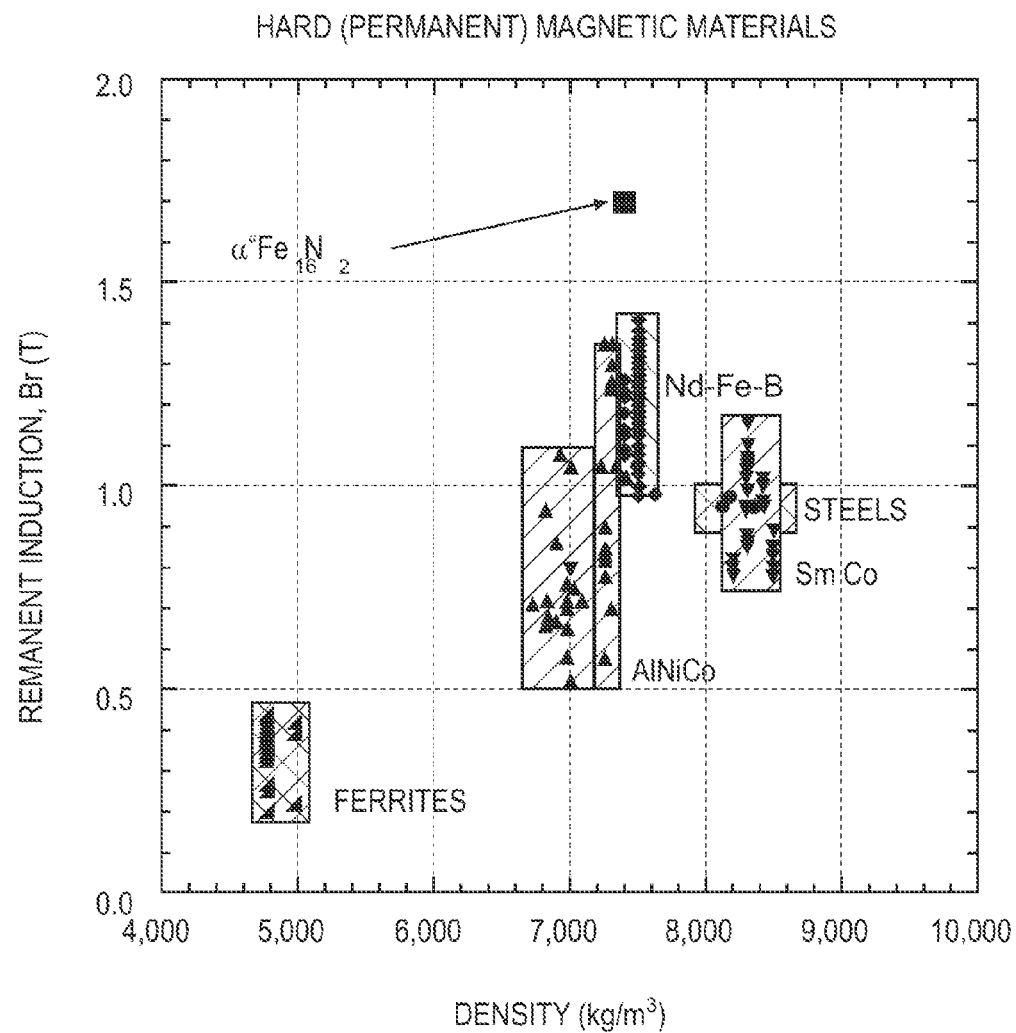
FIG. 1a is a graph of remanent induction versus density for select hard permanent magnetic materials, including $\alpha''$Fe16N2 in accordance with aspects of the disclosure.
Figure 1B:
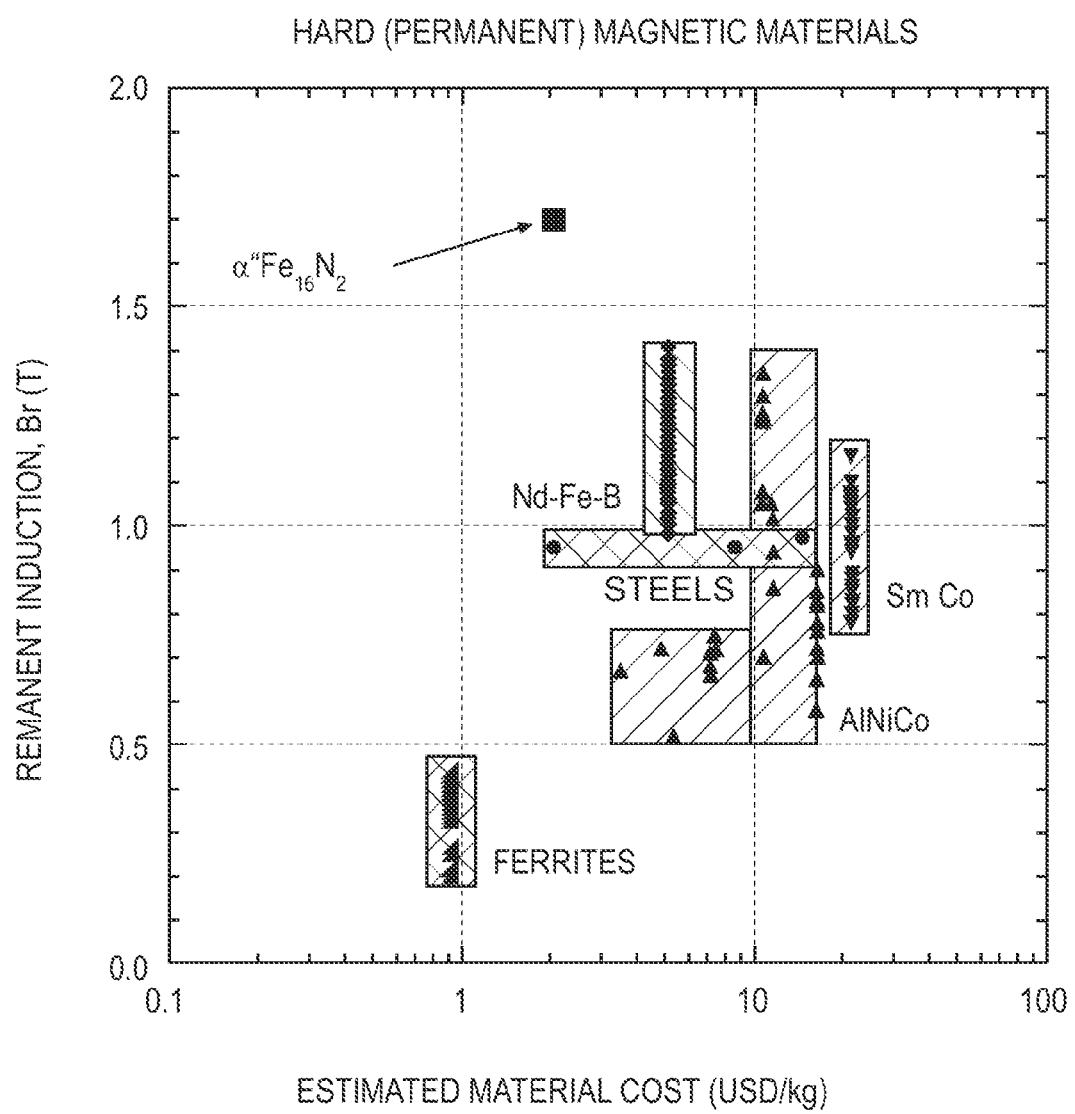
FIG. 1b is a graph of remanent induction versus the estimated material cost for hard permanent magnetic materials, in accordance with aspects of the disclosure.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

The invention is directed to a process and composition that eliminates rare earth elements in permanent magnet materials. In particular, bulk powders are transformed to $\alpha''$-$Fe16N_2$, an ordered martensite. This is accomplished by a novel process enabling the dissolving of much more nitrogen in austenitic Fe-base alloys than possible in elemental Fe, transforming the nitrogen-rich austenite to martensite ($\alpha'$) by high energy ball milling, and finally transforming the martensite to the ordered $\alpha''$-Fe16N2 by tempering. The dissolving may have a ratio of 16:2 metal:nitrogen in austenitic Fe-base alloys.

Micro-alloying is used to expand the single-phase austenite (γ-Fe) region in the Fe—N phase diagram. This enables the nitrogen concentration necessary to produce the intermediate martensite with the optimal stoichiometric composition. A subsequent low temperature aging heat treatment will complete the transformation to α"-Fe16N2.

There are at least five (5) steps to the process of making an ordered martensitic iron nitride powder that is suitable as a permanent magnetic material. The steps are: fabricating an iron alloy powder having a desired composition and uniformity; nitriding the iron alloy powder by contacting the material with a nitrogen source in a fluidized bed reactor to produce a nitride iron powder; transforming the nitride iron powder to a disordered martensitic phase; annealing the disordered martensitic phase to an ordered martensitic phase and separating the ordered martensitic phase from the iron nitride powder to yield an ordered martensitic iron nitride powder. Each of these processing steps is explained in detail below.

The preliminary step is to calculate and then fabricate the correct composition of the starting iron alloy powders. Compositions are calculated using a CALPHAD (CALculation of Phase Diagrams) approach. This approach is useful to predict the solubility of carbon and nitrogen in austenitic steels based upon their alloy content. The key insight to this approach is recognizing that alloying elements that enhance the solubility of carbon and nitrogen invariably form relatively stable compound phases with those two elements. Therefore, the aim is to add enough alloying element to increase the solubility, but not so much that a precipitate phase forms that will then greatly reduce the solubility.

The alloying metal is added to increase the concentration of interstitial nitrogen into the γ-Fe phase (austenite) from equilibrium concentration of 10.3 at % at zero alloying concentration to the desired 11.1 at % nitrogen. The amount of alloying metal needed depends on the alloying material—for instance 1 at % for chromium and 6 at % for manganese. Once the desired composition is calculated the four processing steps may begin.

Fabrication of the iron alloy powder will now be explained. Fabricating the iron alloy powder may be accomplished by using two distinctly different methods. The first method uses melt atomization. During melt atomization, a master alloy of Fe with 20 at % Cr is made in an arc melter. After solidification, additional pure iron powder is added to the master alloy to achieve the desired 99 at % Fe-1 at % Cr alloy. The additional pure iron powder is melted and sprayed out using a melt atomizer process. Melt atomization, however, is an expensive method.

A more cost effective method may be used in which the Fe—Cr powder mixture is initially mechanically alloyed in a mixer mill for a period of time. In some aspects according to the disclosure, the Fe—Cr powder mixture is mechanically allowed in the mixer miller for 48 hours. An example of a suitable mixer mill is the SPEX 8000 mill, which is a high-energy ball mill. The mixture is then homogenized using a high temperature diffusion process at 850° C., which is a temperature below the α-Fe to γ-Fe phase transition temperature. Furthermore, in another embodiment according to the disclosure, an attritor mill is used to achieve the mechanical alloying followed by a high temperature diffusion process. Both of these processes are able to achieve a compositional uniformity of 1.0±0.1 at % Cr in Fe powder.

Other suitable methods to fabricate the iron alloy powder include a powder synthesis technique employing carbonyl-based processing. Another suitable method of obtaining the iron alloy powder is to cast the required compositions followed by mechanically reducing the bulk ingots into powder.

The concentrations of several candidate alloying elements in iron that will enable 11.1 at % of nitrogen to be soluble in the austenite phase will be defined. The relationship between nitrogen solubility and the alloying element concentration in austenite is determined using CALPHAD-based solution thermodynamic modeling. Calculations are performed using both available ThermoCalc software and an independent database. ThermoCalc software is available from Thermo-Calc Software, Inc., McMurray, Pa.

There are risks involved with this assessment because of the possibility of errors in the parameters contained in the software, or database. Calculations performed using the commercial ThermoCalc software and the independent databases are checked against each other to verify the accuracy of the results.

This methodology is used to determine the solubilities of both carbon and nitrogen in iron-based austenite containing a broad range of alloying elements. The predictions are typically consistent and quite accurate for temperatures above 600° C., the temperature range where it is anticipated that the process of nitriding the iron alloy powder will occur. Once the minimum necessary alloy levels have been established for several candidate elements, e.g. Cr, Mn, Ni, Co, Al, several of those compositions are used for the fabrication of powder.

An iron alloy powder having the compositions prescribed by the thermodynamic modeling is produced. The initial powder composition is chosen based upon the attribute of having a minimum alloy content, i.e., maximum iron content. Making the alloy iron powder involves coating or mechanically alloying essentially pure iron powder particles with the desired alloying element followed by annealing to yield a homogeneous composition.

Once the iron alloy powder is fabricated, a representative sample of particles is evaluated for proper chemistry and homogeneity using energy dispersive x-ray spectroscopy (EDS) in conjunction with a scanning electron microscopes (SEM).

After successfully making the iron alloy powders with the desired composition and uniformity, the Fe alloy powders are nitrided. The iron alloy powders are placed into a fluidized bed reactor. The fluidizing flow rates depend on the particle size of the alloy powder.

For example, the following procedure may be followed using 10-20 μm Fe alloy powder in a 1 inch (2.54 centimeters) diameter reactor starting at room temperature and air atmosphere pressure:

1.) flow nitrogen gas and heat to 580° C. (1076 degree Fahrenheit) allowing 30 minutes for the ramp-to-temperature;

2.) flow a reducing gas mixture (hydrogen/nitrogen mix) for 4 hours at 580° C. (1076 degree Fahrenheit)

3.) switch gas mixture to 20% ammonia/80% nitrogen and anneal for 18 hours at 580° C. (1076 degree Fahrenheit)

4.) slow cool to ~50° C. (122 degree Fahrenheit) under 10% ammonia/90% nitrogen for approximately 20 hours;

5.) vent for enough time with nitrogen to allow safe opening of the system.

In one embodiment according to the disclosure, the iron alloy powder will be exposed to a hydrogen-ammonia (H2:NH3) environment at a temperature above 650° C. (1202 degree Fahrenheit) that will increase the powder's nitrogen content to 11.1 at. %, i.e., the stoichiometric composition for α" phase. The starting powder is a α-phase and the nitridization process causes the powder to transform to γ-phase. A controlled atmosphere furnace is used.

The nitrogen content of the processed nitride iron powder is measured using analytical instrumentation. Analyses with wavelength dispersive x-ray spectroscopy (WDS), Auger electron spectroscopy (AES) and x-ray photoelectron spectroscopy (XPS also referred to as ESCA) is performed. The fully γ-phase, nitride iron powder is then be subjected to severe plastic deformation in a high energy ball mill to drive its transformation to α' martensite.

The third step is transforming the nitrided iron alloy powders to the disordered martensitic phase, α'-Fe16N2. After nitriding the iron alloy powder, the α-Fe: 1 at % Cr powder has the desired 11.1% nitrogen dissolved interstitially into the alloy. This phase can be transformed into the disordered α'-Fe16N2 phase by combining the effects of low temperature (for example liquid nitrogen temperature of 77K) with mechanical deformation. This is achieved by placing the nitrided powders into a high energy ball mill that is cooled by liquid nitrogen. Appropriate care must be taken to properly vent the mill mixing vial such that over pressurization does not occur.

The fourth step is annealing the disordered martensitic phase,α"-Fe16N2. to the ordered martensitic phase,α"-Fe16N2. A low temperature anneal is required to achieve the ordered martensitic phase, α"-Fe16N2. Suitable temperatures for the low temperature anneal may range from 100° C. (212 degree Fahrenheit) to 300° C. (572 degree Fahrenheit).

The γ-phase nitrided iron powder containing 11.1 at. % nitrogen will be transformed to α' martensite retaining the same nitrogen content. At the 11.1 at. % nitrogen level the powder will be quite resistant to transformation to α'. To enable the transformation to proceed, the γ-phase powder will be subjected to a significant amount of plastic deformation in a high energy ball mill. The ball milling is intended to occur at room temperature. Alternatively, the ball milling may require liquid nitrogen temperatures as described above. If the temperature of the powder rises substantially due to its absorption of energy during repeated impacts, or an increased driving force is required to ensure the γ to α' transformation goes to completion, active cooling also will be employed during ball milling. The γ to α' transformation is facilitated with relatively large size powder particles. Once transformation to α' martensite is finished further ball milling can be used to reduce the final average powder particle size. The ball milled powder is analyzed using a standard x-ray diffraction technique to determine if any γ-phase is retained.

Next, the austenite powder that has been converted to α' will be transformed to α" the final material produced by the disclosed process. For this purpose, the α' powder is tempered. The ideal temperature for this processing step is around 420K (147° C.). Based on this ideal temperature, the temperature range used is between 370K (97° C.) and 470K (197° C.) and a range of annealing times from 1,000 s up to 86,000 s (24 h) if needed.

If surface oxidation of the powder turns out to progress at a disturbingly rapid level, the powders will be encapsulated in evacuated and Ar-backfilled fused silica ampoules. The results are validated by XRD (X-ray diffractometry) and TEM (transmission electron microscopy). XRD is also carried out using an X-ray diffraction system. TEM is carried out using a transmission electron microscope, either the Tecnai F30 (FEI) or the Libra 200EF (Zeiss). Both techniques can discriminate between α' and α" by evaluating the superlattice reflections that arise in diffraction patterns because of the ordering that offsets α" from α'.

The final step involves separating the ordered martensitic phase, α"-Fe16N2 from the mixed nitride powder. It is possible that after completion of all the processing steps, a mixed powder exists of the desired ordered martensitic phase, α"-Fe16N2 plus other undesired iron and iron nitride phases. A separation process using the fluidized bed and an external magnetic field is used to filter the desired phase.

The new powder composition can be used to form a permanent magnet, which can be used in electric motor, generator products, and the like. The new composition can be used to make magnets to replace existing Nd13 Fe—B-permanent magnets and other rare-earth permanent magnets.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

What is claimed is:

1. A process for producing a single-phase γ-austenite iron-based alloy nitride powder that is suitable for producing a martensitic iron-based alloy nitride powder, comprising the steps of:
   a) providing an iron-based alloy powder; and
   b) nitriding the iron-based alloy powder by contacting the material with a nitrogen source, thereby producing the single-phase γ-austenite iron-based alloy nitride powder;
   wherein the iron-based alloy powder has an alloy composition that enables a greater amount of nitrogen to be soluble in the single-phase γ-austenite iron-based alloy nitride powder during the nitriding as compared to a maximum solubility of nitrogen in elemental iron that is nitrided under the same conditions,
   wherein the nitrogen content soluble in the single-phase γ-austenite iron-based alloy nitride powder during the nitriding is in the range from greater than 10.3 at. % to 11.1 at. %.

2. The process according to claim 1, wherein the nitrogen content soluble in the single-phase γ-austenite iron-based alloy nitride powder during the nitriding is 11.1 at. %.

3. The process according to claim1, wherein the single-phase γ-austenite iron-based alloy nitride powder produced during the nitriding consists of the austenitic γ-phase iron-based alloy as a single-phase solid solution having the nitrogen diffused interstitially into the iron-based alloy lattice structure.

4. The process according to claim 1, wherein the single-phase γ-austenite iron-based alloy nitride powder includes chromium as an alloying element that enables the greater solubility of nitrogen during the nitriding.

5. The process according to claim 4, wherein the single-phase γ-austenite iron-based alloy nitride powder includes 11.1 at. % nitrogen and chromium in a range from 0.9 at. % to 2.7 at. %.

6. The process according to claim 4, wherein a compositional uniformity of the chromium in the single-phase γ-austenite iron-based alloy nitride powder is 1.0±0.1 at. %.

7. The process according to claim 1, wherein the single-phase γ-austenite iron-based alloy nitride powder includes manganese as an alloying element that enables the greater solubility of nitrogen during the nitriding.

8. The process according to claim 7, wherein the single-phase γ-austenite iron-based alloy nitride powder includes 11.1 at. % nitrogen and manganese in a range from 3.1 at. % to 8.7 at. %.

9. A process for producing a single-phase γ-austenite iron-based alloy nitride powder that is suitable for producing a martensitic iron-based alloy nitride powder, comprising the steps of:
   a) providing an iron-based alloy powder; and
   b) nitriding the iron-based alloy powder by contacting the material with a nitrogen source, thereby producing the single-phase γ-austenite iron-based alloy nitride powder;
   wherein the iron-based alloy powder has an alloy composition that enables a greater amount of nitrogen to be soluble in the single-phase γ-austenite iron-based alloy nitride powder during the nitriding as compared to a maximum solubility of nitrogen in elemental iron that is nitrided under the same conditions,
   wherein the nitriding includes diffusing nitrogen interstitially into the iron-based alloy lattice structure at a ratio of 16:2 metal:nitrogen.

10. A process for producing a single-phase γ-austenite iron-based alloy nitride powder that is suitable for producing a martensitic iron-based alloy nitride powder, comprising the steps of:
   a) providing an iron-based alloy powder; and
   b) nitriding the iron-based alloy powder by contacting the material with a nitrogen source, thereby producing the single-phase γ-austenite iron-based alloy nitride powder;
   wherein the iron-based alloy powder has an alloy composition that enables a greater amount of nitrogen to be soluble in the single-phase γ-austenite iron-based alloy nitride powder during the nitriding as compared to a maximum solubility of nitrogen in elemental iron that is nitrided under the same conditions,
   wherein the single-phase γ-austenite iron-based alloy nitride powder includes aluminum as an alloying element that enables the greater solubility of nitrogen during the nitriding.

11. The process according to claim 10, wherein the single-phase γ-austenite iron-based alloy nitride powder includes aluminum in a range from 1.7 at. % to 5.2 at. %.

12. The process according to claim 11, wherein the nitrogen content soluble in the single-phase γ-austenite iron-based alloy nitride powder during the nitriding is in the range from greater than 10.3 at. % to 11.1 at. %.

13. A process for producing a single-phase γ-austenite iron-based alloy nitride powder that is suitable for producing a martensitic iron-based alloy nitride powder, comprising the steps of:
   a) providing an iron-based alloy powder; and
   b) nitriding the iron-based alloy powder by contacting the material with a nitrogen source, thereby producing the single-phase γ-austenite iron-based alloy nitride powder; wherein the iron-based alloy powder has an alloy composition that enables a greater amount of nitrogen to be soluble in the single-phase γ-austenite iron-based alloy nitride powder during the nitridinq as compared to a maximum solubility of nitrogen in elemental iron that is nitrided under the same conditions,
   wherein the single-phase γ-austenite iron-based alloy nitride powder includes chromium as an alloying element that enables the greater solubility of nitrogen during the nitriding, the chromium being in a range from 0.9 at. % to 2.7 at. %.

14. The process according to claim 13, wherein the nitrogen content soluble in the single-phase γ-austenite iron-based alloy nitride powder during the nitriding is in the range from greater than 10.3 at. % to 11.1 at. %.

15. A process for producing a single-phase γ-austenite iron-based alloy nitride powder that is suitable for producing a martensitic iron-based alloy nitride powder, comprising the steps of:
   a) providing an iron-based alloy powder; and
   b) nitriding the iron-based alloy powder by contacting the material with a nitrogen source, thereby producing the single-phase γ-austenite iron-based alloy nitride powder;
   wherein the iron-based alloy powder has an alloy composition that enables a greater amount of nitrogen to be soluble in the single-phase γ-austenite iron-based alloy nitride powder during the nitriding as compared to a maximum solubility of nitroqen in elemental iron that is nitrided under the same conditions,
   wherein the nitriding includes diffusing nitrogen interstitially into the iron-based alloy lattice structure via exposure to the nitrogen source in a fluidized bed reactor.

16. A process for producing a single-phase γ-austenite iron-based alloy nitride powder that is suitable for producing a martensitic iron-based alloy nitride powder, comprising the steps of:
   a) providing an iron-based alloy powder; and
   b) nitriding the iron-based alloy powder by contacting the material with a nitrogen source, thereby producing the single-phase γ-austenite iron-based alloy nitride powder;
   wherein the iron-based alloy powder has an alloy composition that enables a greater amount of nitrogen to be soluble in the single-phase γ-austenite iron-based alloy nitride powder during the nitridinq as compared to a maximum solubility of nitroqen in elemental iron that is nitrided under the same conditions,
   further comprising the step:
   transforming the single-phase γ-austenite iron-based alloy nitride powder to a disordered α'-martensitic phase iron-based alloy nitride powder.

17. The process according to claim 16, wherein the step of transforming includes subjecting the single-phase γ-austenite iron-based alloy nitride powder to plastic deformation in a high energy ball mill.

18. The process according to claim 16, further comprising the step:
   annealing the disordered α'-martensitic phase iron-based alloy nitride powder to produce an ordered α"-martensitic phase iron-based alloy nitride powder.

19. The process according to claim 18, wherein the ordered α"-martensitic phase iron-based alloy nitride has a composition $(Fe,M)_{16}N_2$, where M is the alloying element of the iron-based alloy nitride.

20. The process according to claim 18, further comprising the steps:
   separating the ordered α"-martensitic phase iron-based alloy nitride powder from non-α"-martensitic phase iron-based alloy nitride powder; and
   bonding the ordered α"-martensitic phase iron-based alloy nitride powder to form a permanent magnet.

21. A process for producing a single-phase γ-austenite iron-based alloy nitride powder that is suitable for producing a martensitic iron-based alloy nitride powder, comprising the steps of:
   a) providing an iron-based alloy powder; and b) nitriding the iron-based alloy powder by contacting the material with a nitrogen source, thereby producing the single-phase γ-austenite iron-based alloy nitride powder; wherein the iron-based alloy powder has an alloy composition that enables a greater amount of nitrogen to be soluble in the single-phase γ-austenite iron-based alloy nitride powder during the nitriding as compared to a maximum solubility of nitrogen in elemental iron that is nitrided under the same conditions, wherein the single-phase γ-austenite iron-based alloy nitride powder includes manganese as an alloying element that enables the greater solubility of nitrogen during the nitriding, the manganese being in a range from 3.1 at. % to 8.7 at. %.

22. The process according to claim 21, wherein the nitrogen content soluble in the single-phase γ-austenite iron-based alloy nitride powder during the nitriding is in the range from greater than 10.3 at. % to 11.1 at. %.

* * * * *